(12) United States Patent
Goertz et al.

(10) Patent No.: US 11,649,178 B2
(45) Date of Patent: May 16, 2023

(54) SYSTEMS AND METHODS FOR REMOVING ORGANIC COMPOUNDS FROM WATER USED TO GENERATE STEAM

(71) Applicant: Donaldson Company, Inc., Minneapolis, MN (US)

(72) Inventors: Matthew P. Goertz, Bloomington, MN (US); Jonathan G. Parsons, Lino Lakes, MN (US)

(73) Assignee: Donaldson Company, Inc., Bloomington, MN (US)

( * ) Notice: Subject to any disclaimer, the term of this patent is extended or adjusted under 35 U.S.C. 154(b) by 29 days.

(21) Appl. No.: 17/071,100

(22) Filed: Oct. 15, 2020

(65) Prior Publication Data

US 2021/0107808 A1 Apr. 15, 2021

Related U.S. Application Data

(60) Provisional application No. 62/915,456, filed on Oct. 15, 2019.

(51) Int. Cl.
*C02F 1/44* (2006.01)
*B01D 15/18* (2006.01)
(Continued)

(52) U.S. Cl.
CPC ............ *C02F 1/44* (2013.01); *B01D 15/1871* (2013.01); *B01D 15/1885* (2013.01);
(Continued)

(58) Field of Classification Search
CPC .... C02F 1/28; C02F 1/44; C02F 1/444; C02F 2101/38; C02F 2103/32; B01D 15/1871;
(Continued)

(56) References Cited

U.S. PATENT DOCUMENTS

| | | |
|---|---|---|
| 3,274,029 A | 9/1966 | Lurie et al. |
| 3,424,548 A | 1/1969 | Gunther |

(Continued)

FOREIGN PATENT DOCUMENTS

| | | |
|---|---|---|
| CN | 1750867 | 3/2006 |
| CN | 102165268 | 8/2011 |

(Continued)

OTHER PUBLICATIONS

Memarzadeh, F., "Adding amines to steam for humidification", Journal of chemical health and safety, vol. 21, No. 4, July/August (Year: 2014).*

(Continued)

*Primary Examiner* — Benjamin L Lebron
(74) *Attorney, Agent, or Firm* — Mueting Raasch Group

(57) ABSTRACT

A system for producing steam includes a source of superheated water with superheated water output; a membrane filtration system in fluid communication with the superheated water output and including a membrane filter with a permeate side and an opposing retentate side. The membrane filter includes a separation membrane constructed to reject organic molecules. The system may be used for removing organic compounds, such as anti-corrosion agents or contaminants, from superheated water to produce steam. A method for producing steam includes directing a cross-flow of heated pressurized water including a first concentration of an organic compound across a membrane filter. The membrane filter includes a separation membrane constructed to reject the organic compound; and one or more support layers adjacent the separation membrane. A steam permeate including a second concentration of the organic compound is collected, where the second concentration is lower than the first.

20 Claims, 5 Drawing Sheets

(51) Int. Cl.
*B01D 71/32* (2006.01)
*C02F 1/28* (2006.01)
*F22D 11/00* (2006.01)
*B01D 63/10* (2006.01)
*C02F 101/38* (2006.01)
*C02F 103/32* (2006.01)

(52) U.S. Cl.
CPC .............. *B01D 63/10* (2013.01); *B01D 71/32* (2013.01); *C02F 1/28* (2013.01); *F22D 11/006* (2013.01); *B01D 2313/143* (2013.01); *B01D 2317/02* (2013.01); *B01D 2317/04* (2013.01); *C02F 2101/38* (2013.01); *C02F 2103/32* (2013.01)

(58) Field of Classification Search
CPC .... B01D 15/1885; B01D 63/10; B01D 71/32; B01D 2313/143; B01D 2317/02; B01D 2317/04; F22D 11/006
See application file for complete search history.

(56) References Cited

U.S. PATENT DOCUMENTS

| | | | |
|---|---|---|---|
| 4,342,730 | A | 8/1982 | Perrotta |
| 4,395,494 | A | 7/1983 | Bodart et al. |
| 4,437,968 | A * | 3/1984 | Elliott, Jr. ............... F22D 11/00 204/600 |
| 4,879,041 | A | 11/1989 | Kurokawa et al. |
| 4,895,685 | A | 1/1990 | Honda et al. |
| 4,985,147 | A | 1/1991 | Mochizuki et al. |
| 5,059,327 | A | 10/1991 | Takegami |
| 5,707,522 | A | 1/1998 | Maeda et al. |
| 5,892,129 | A | 4/1999 | Hoepp et al. |
| 5,954,966 | A | 9/1999 | Matsuura et al. |
| 6,210,464 | B1 | 4/2001 | Nakanishi et al. |
| 6,406,517 | B1 | 6/2002 | Avery et al. |
| 6,413,303 | B2 | 7/2002 | Gelderland et al. |
| 6,572,679 | B2 | 6/2003 | Baker et al. |
| 6,645,271 | B2 | 11/2003 | Seguin et al. |
| 6,708,517 | B1 * | 3/2004 | Piao ................. B64D 13/06 62/324.1 |
| 6,789,288 | B2 | 9/2004 | Wijmans et al. |
| 7,964,411 | B2 | 6/2011 | Dasgupta et al. |
| 8,282,708 | B2 | 10/2012 | Spiegelman et al. |
| 8,769,971 | B2 | 7/2014 | Kozubal et al. |
| 8,828,121 | B1 | 9/2014 | He et al. |
| 9,061,252 | B2 | 6/2015 | Huang et al. |
| 9,387,445 | B2 | 7/2016 | Kimura et al. |
| 2006/0070867 | A1 | 4/2006 | Ikeda |
| 2008/0017578 | A1 | 1/2008 | Childs et al. |
| 2010/0319535 | A1 | 12/2010 | Joshi et al. |
| 2011/0000367 | A1 | 1/2011 | Kanougi et al. |
| 2011/0107911 | A1 | 5/2011 | Hoang et al. |
| 2013/0233170 | A1 | 9/2013 | Spiegelman et al. |
| 2015/0159556 | A1 | 6/2015 | Scipio et al. |
| 2015/0204536 | A1 | 7/2015 | Singh et al. |
| 2015/0375173 | A1 * | 12/2015 | Steen ................... B01D 61/025 210/323.2 |
| 2016/0290664 | A1 | 10/2016 | Dean et al. |
| 2017/0368498 | A1 | 12/2017 | He et al. |
| 2021/0239314 | A1 | 8/2021 | Goertz et al. |

FOREIGN PATENT DOCUMENTS

| | | |
|---|---|---|
| CN | 106621853 | 5/2017 |
| CN | 108726501 | 11/2018 |
| EP | 0707179 | 4/1996 |
| EP | 2188036 | 5/2010 |
| JP | H01107805 | 4/1989 |
| JP | H0398687 | 4/1991 |
| JP | H03202133 | 9/1991 |
| WO | 2009012189 | 1/2009 |
| WO | 2011/095805 | 8/2011 |
| WO | 2019/213500 | 11/2019 |

OTHER PUBLICATIONS

3-A Sanitary Standards, Inc., et al., "3-A® Accepted Practices for a Method of Producing Culinary Steam, No. 609-03", Nov. 21, 2004, 3-A Sanitary Standards, Inc., McLean, Virigina, 8 pages.

European Patent Application No. 08 78 1753, filed Feb. 12, 2010, Supplementary European Search Report dated Jul. 18, 2011, 4 pages.

Huang, et al., "Ethanol Dehydration Using Hydrophobic and Hydrophilic Polymer Membranes", 2010, Ind. Eng. Chem. Res., 49(23):12067-12073. Available online Jun. 15, 2010.

Information Sheet, "Culinary grade steam filters: Specification guidelines: Process Filtration", 2016, Donaldson Filtration Solutions, Donaldson Company, Inc., Minneapolis, Minnesota, 2 pages.

International Patent Application No. PCT/US2019/030569 filed May 3, 2019; PCT International Search Report and Written Opinion dated Jul. 23, 2019, 10 pages.

International Patent Application No. PCT/US2019/030569, filed May 3, 2019; PCT International Preliminary Reporton Patentability dated Nov. 10, 2020, 7 pages.

Pinnau, et al., "Gas and vapor transport properties of amorphous perfluorinated copolymer membranes based on 2,2-bistrifluoromethyl-4,5-difluoro-1,3-dioxole/tetrafluoroethylene", Jan. 10, 1996, Journal of Membrane Science, 109(1):125-133.

* cited by examiner

SYSTEMS AND METHODS FOR REMOVING ORGANIC COMPOUNDS FROM WATER USED TO GENERATE STEAM

CROSS REFERENCE TO RELATED APPLICATIONS

This application claims the benefit of U.S. Provisional Patent Application No. 62/915,456, filed 15 Oct. 2019, the disclosure of which is incorporated by reference herein in its entirety.

FIELD

The present disclosure relates to systems and methods for removing compounds from water. In particular, the present disclosure relates to systems and methods for removing organic compounds, such as compounds used as anti-corrosion agents, from heated pressurized water used to generate steam.

BACKGROUND

Steam is used in many industries for various purposes, including transferring heat or thermal energy from a source to a point of use. Steam may be produced in various ways, including using a boiler, where water is heated to its boiling point. The water can be heated directly or indirectly using a heat source, such as a burner, a heat exchanger, or an electric heater. Using direct heat boilers is most common, as the systems are simpler, more efficient, and more cost-effective than, for example, heat exchangers.

Due to the potentially corrosive nature of dissolved acids, such as carbonic acid, in steam, it may be necessary to add anti-corrosion agents to the steam or to the water used to make the steam to protect the boiler and other parts of the system (e.g., metal piping). However, for some end uses of steam it would be desirable to provide steam that does not contain anti-corrosion agents or other compounds that are incompatible with the particular end use.

SUMMARY

The present disclosure relates to a system for producing steam, the system including a source of superheated water comprising a hot water output capable of delivering heated water under pressure; and a membrane filtration system in fluid communication with the hot water output. The membrane filtration system includes a first membrane filter with a permeate side and an opposing retentate side. The membrane filter includes a separation membrane adjacent the retentate side, the separation membrane being constructed to reject organic molecules; and one or more support layers adjacent the permeate side.

The separation membrane may include a fluorinated (e.g., perfluorinated) polymer membrane (e.g., separation layer) and one or more support layers comprising polyamide, polyimide, polysulfone, polyphenylene sulfide, PVDF, PTFE, or a combination thereof. The membrane filter may include a plurality of layers of separation membranes separated by spacers, where the spacers are constructed from polyamide, polyimide, polypropylene, polyethylene, PTFE, PVDF, or a combination thereof.

The system may include one or more additional filters upstream of the membrane filter or downstream of the membrane filter permeate side. The one or more additional filters may include a second membrane filter, an adsorbent filter, a particle filter, or a combination thereof.

The system may be used to provide steam to a sterilizer, a humidifier, or a culinary steam outlet.

The present disclosure further relates to a method for producing steam, the method including directing a cross-flow of heated pressurized water having a first concentration of the organic compound across a membrane filter. The membrane filter includes a separation membrane constructed to reject the organic compound; and one or more support layers adjacent the permeate side. The method further includes collecting a steam permeate having a second concentration of the organic compound lower than the first concentration.

The organic compound may be an anti-corrosion agent, such as an amine. The first concentration may be greater than 20 ppm and the second concentration may be lower than 10 ppm.

DETAILED DESCRIPTION

Figure 1:
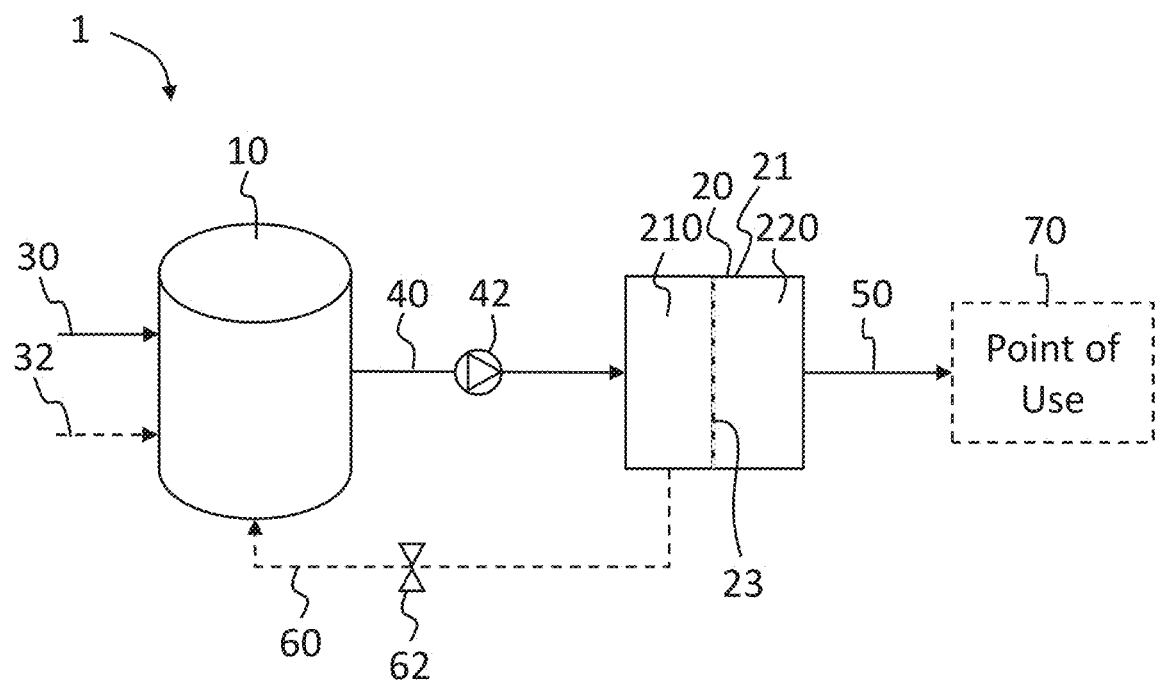
FIG. 1 is a flow diagram of a steam supply system according to an embodiment.

The present disclosure relates to systems and methods that are suitable for removing compounds, such as organic molecules, from water used to generate steam. In particular, the present disclosure relates to systems and methods that are suitable for removing organic compounds, such as organic contaminants or compounds used as anti-corrosion agents, from heated, pressurized water (e.g., superheated water) used to generate steam. The systems and methods of the present disclosure may be useful for preparing clean steam for various end uses.

The term "alkylated" is used in this disclosure to describe compounds that are reacted to replace a hydrogen atom or a negative charge of the compound with an alkyl group, such that the alkyl group is covalently bonded to the compound.

The term "alkyl" is used in this disclosure to describe a monovalent group that is a radical of an alkane and includes straight-chain, branched, cyclic, and bicyclic alkyl groups, and combinations thereof, including both unsubstituted and substituted alkyl groups. Unless otherwise indicated, the alkyl groups typically contain from 1 to 30 carbon atoms. In some embodiments, the alkyl groups contain 1 to 20 carbon atoms, 1 to 10 carbon atoms, 1 to 6 carbon atoms, 1 to 4 carbon atoms, or 1 to 3 carbon atoms. Examples of alkyl groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, etc.

The term "aryl" refers to a monovalent group that is aromatic and, optionally, carbocyclic. The aryl has at least one aromatic ring. Any additional rings can be unsaturated, partially saturated, saturated, or aromatic. Optionally, the aromatic ring can have one or more additional carbocyclic rings that are fused to the aromatic ring. Unless otherwise indicated, the aryl groups typically contain from 6 to 30 carbon atoms. In some embodiments, the aryl groups contain 6 to 20, 6 to 18, 6 to 16, 6 to 12, or 6 to 10 carbon atoms. Examples of an aryl group include phenyl, naphthyl, biphenyl, phenanthryl, and anthracyl.

The term "aromatic ring" is used in this disclosure to refer to a conjugated planar ring system of an organic compound. Aromatic rings may include carbon atoms only, or may include heteroatoms, such as oxygen, nitrogen, or sulfur.

The term "amine" is used here to refer to compounds that include a basic nitrogen atom with a lone electron pair. Amines can be either primary (including functional group —$NR^1H_2$), secondary (including functional group —$NR^1R^2H$), or tertiary (including functional group —$NR^1R^2R^3$). The R-groups may be independently selected, and may include alkyl groups, aryl groups, or halides.

The term "volatile" is used here to refer to compounds that have an initial boiling point less than or equal to 250° C. measured at a standard atmospheric pressure of 101.3 kPa.

The term "superheated water" is used here to refer to liquid water (e.g., water in liquid phase) that has a temperature of 100° C. or greater and pressure of 1 atm (101 kPa) or greater, where at least one of the temperature and pressure is above the 100° C. or 1 atm, respectively.

The term "substantially" as used here has the same meaning as "significantly," and can be understood to modify the term that follows by at least about 75%, at least about 90%, at least about 95%, or at least about 98%. The term "not substantially" as used here has the same meaning as "not significantly," and can be understood to have the inverse meaning of "substantially," i.e., modifying the term that follows by not more than 25%, not more than 10%, not more than 5%, or not more than 2%.

Relative terms such as proximal, distal, left, right, forward, rearward, top, bottom, side, upper, lower, horizontal, vertical, and the like may be used in this disclosure to simplify the description. However, such relative terms do not limit the scope of the invention in any way. Terms such as left, right, forward, rearward, top, bottom, side, upper, lower, horizontal, vertical, and the like are from the perspective observed in the particular figure.

The terms "upstream" and "downstream" are used there to refer to a position along the flow of water or steam from the source of superheated water to the point of use. The source of superheated water is considered to be at or near the upstream end of the system, and the point of use is considered to be at or near the downstream end of the system.

The terms "proximal" and "distal" are used to represent directions relative to a user using or holding the article. That is, the term "distal" is used to refer to the direction away from the user and toward the applicator-end of the dispenser; and the term "proximal" is used to refer to the direction toward the user and away from the applicator-end.

The term "about" is used here in conjunction with numeric values to include normal variations in measurements as expected by persons skilled in the art, and is understood have the same meaning as "approximately" and to cover a typical margin of error, such as ±5% of the stated value.

Terms such as "a," "an," and "the" are not intended to refer to only a singular entity, but include the general class of which a specific example may be used for illustration.

The terms "a," "an," and "the" are used interchangeably with the term "at least one." The phrases "at least one of" and "comprises at least one of" followed by a list refers to any one of the items in the list and any combination of two or more items in the list.

As used here, the term "or" is generally employed in its usual sense including "and/or" unless the content clearly dictates otherwise. The term "and/or" means one or all of the listed elements or a combination of any two or more of the listed elements.

The recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" or "at least" a particular value, that value is included within the range.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

According to some embodiments, the systems and methods of the present disclosure are suitable for removing compounds, such as organic molecules, from water used to generate steam. For example, the systems and methods of the present disclosure are suitable for removing organic compounds, such as organic contaminants or compounds used as anti-corrosion agents, from heated, pressurized water (e.g., superheated water). The systems and methods of the present disclosure may be particularly useful for providing clean steam to end uses that need steam without additives, such as anti-corrosion agents. Examples of such end uses include humidification, sterilization, and culinary uses.

Anti-corrosion agents may be added to water or steam either in a water tank, water heater, boiler, or in-line to prevent corrosion of various components of the system, such as the water tank, water heater, boiler, pipes and lines (e.g., steel pipes), tanks, and other elements that may come in contact with the water or steam. Some anti-corrosion agents may be added in the water tank, water heater, or boiler but due to their non-volatile nature, remain there as the water or steam is let out of the water tank, water heater, or boiler. However, some anti-corrosion agents are volatile, and vaporize as steam is generated from water, and travel with the steam downstream of the steam generation. Examples of such anti-corrosion agents include volatile amines (sometimes called "boiler amines" or "neutralizing amines"). While these agents have beneficial effects within the steam generation system (e.g., boiler system), they may be undesirable at the point of use. It may therefore be desirable to reduce the amount of or remove (e.g., substantially remove) the agents prior to use.

Prior attempts to remove amines from steam include the use of packed bed adsorbent filters, such as those described in U.S. Pat. Nos. 3,424,548 and 4,342,730. For example, U.S. Pat. No. 3,424,548 describes a metallic pressure cartridge constructed of stainless steel and containing an adsorbent resin, connected to a steam supply, and arranged such that steam enters the top of the cylinder and flows down through the adsorbent resin. The resin may be a material capable of adsorbing the volatile amines in the steam, such as an inorganic hydrous oxide with cationic properties, e.g., zirconium phosphate or zirconium tungstate. U.S. Pat. No. 4,342,730 describes a system and method for purifying steam by passing the steam through a particulate filter and then a bed of ion-exchange resin material. The resin material is a strong-acid type polymeric resin, such as a styrene copolymer, in hydrogen form, that captures amines in an acid-base reaction. The resin may be able to remove amines from the steam so that the recovered steam has less than 3 ppm of volatile alkaline material left. However, while packed bed filters may be effective for removing volatile organic compounds from steam, they are typically not very efficient, suffering from a limited capacity. Packed bed filters typically need frequent regeneration and have a limited lifetime before breakthrough of the volatile compounds occurs.

The systems and methods of the present disclosure are suitable for removing organic molecules from water (e.g., heater, pressurized water) used to generate steam. However, the systems and methods are not limited to anti-corrosion agents only, and may be used to remove any undesirable organic components as long as a suitable filter membrane can be provided.

Removing the organic molecules from water in liquid state (e.g., provided as superheated water) may provide certain benefits over removing the organic molecules from steam. When a fluid is passed over a membrane filter in a cross-flow configuration, a certain shear force is needed to detach undesired contaminant particles that may clog the filter device. Liquid water has a relatively high viscosity compared to vapor (e.g., steam) and thus provides sufficient flushing of the membrane surface to detach particles on the surface at a lower volume or flow rate. In the system described in the present disclosure, the retentate flow may be managed with flow directed to a separate location, such as boiler return, vented to atmosphere, or passed on to do further work (e.g., heating). In some embodiments, the retentate flow may be directed by actively pumping the retentate with a mechanical pump system. In general, liquid mechanical pumps are preferable to vapor pumps or compressors because liquid pumps are often less complicated and more cost-effective. Various parts of the system of the present disclosure (e.g., pumps, lines, etc.) may be of a smaller size than in an equivalent system configured for vapor permeation of steam. The system configured for handling superheated water in a liquid state may allow for a smaller and more economical process footprint.

Referring now to FIG. 1, according to some embodiments, the steam supply system 1 includes a source of superheated water 10 having an inlet line 30 and a hot water output 40. For example, the source of superheated water 10 may include any suitable system or device capable of providing superheated water, such as a boiler, a heat exchanger, or an electrically heated water tank. A boiler may or may not include a headspace with steam. In one embodiment, the source of superheated water 10 is a boiler. Water is heated in the source of superheated water 10 by a heater 12 (see, e.g., FIG. 3). The source of superheated water 10 and the hot water output 40 may have an output capacity of at least about 10 lbs/hour (about 5 kg/h), at least about 100 lbs/hour (about 50 kg/h), at least about 500 lbs/hour (about 200 kg/h), and/or up to about 1,000 lbs/hour (about 500 kg/h), up to about 5,000 lbs/hour (about 2,000 kg/h), or up to about 10,000 lbs/hour (about 5,000 kg/h).

The steam supply system 1 may be part of a larger system, where the output line 50 is connected to one or more points of use. The system 1 may also include a mechanism for adding anti-corrosion agents or other compounds to the water used to generate the steam. For example, the system may include one or more storage tanks and injections lines 32 for additives (e.g., anti-corrosion agents). The additives may be injected directly into the source of superheated water 10 or into some other part of the system, e.g., an input line transporting water into the source of superheated water 10 or an output line transporting heated water from the source of superheated water 10. For example, the system 1 may include an injection line 32 in fluid communication with the source of superheated water 10 (e.g., boiler).

According to an embodiment, the organic molecules are removed from the heated pressurized water in a membrane filtration system 20. It should be understood that complete (100%) removal may not always be practical, and the term "remove" is used here to include partial removal (e.g., removing 50 wt-% or more, 60 wt-% or more, 70 wt-% or more, 80 wt-% or more, 90 wt-% or more, 95 wt-% or more, 98 wt-% or more, or 99 wt-% or more).

The hot water output 40 of the source of superheated water 10 (e.g., boiler) may be in fluid communication with a membrane filtration system 20 that includes one or more membrane filters 21. Heated pressurized water (e.g., superheated water) may be pumped from the source of superheated water 10 (e.g., boiler) using a pump 42. The pump 42 may be placed in the hot water output line 40.

The membrane filter 21 has a retentate side 210 (e.g., feed side) and an opposing permeate side 220. The membrane filter 21 includes a selective separation membrane 23 that allows water molecules to pass through in vapor phase, while rejecting (e.g., retaining, not allowing to pass through the membrane) the organic molecules desired to be removed. The permeate (e.g., filtered steam) of the membrane filter 21 can be used at a point of use 70 that is in fluid communication with the membrane filtration system 20. The point of use 70 may be, for example, a sterilizer, a humidifier, or a culinary steam outlet.

Figure 2:
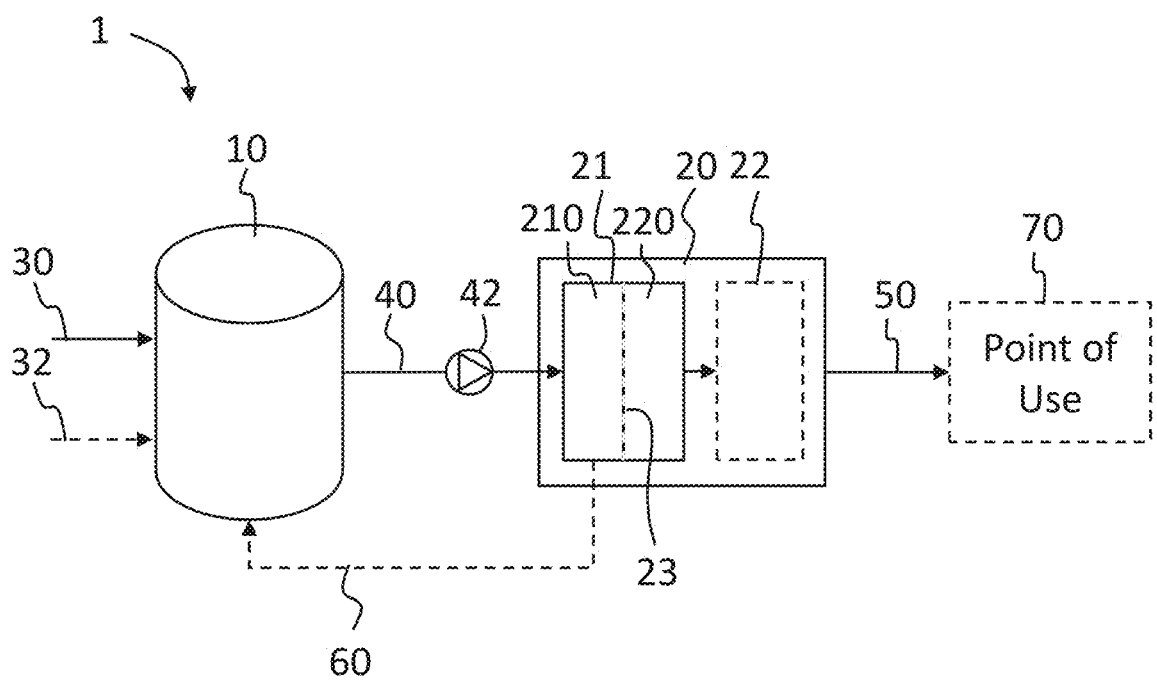
FIG. 2 is a flow diagram of the steam supply system of FIG. 1 according to an embodiment.
Figure 3:
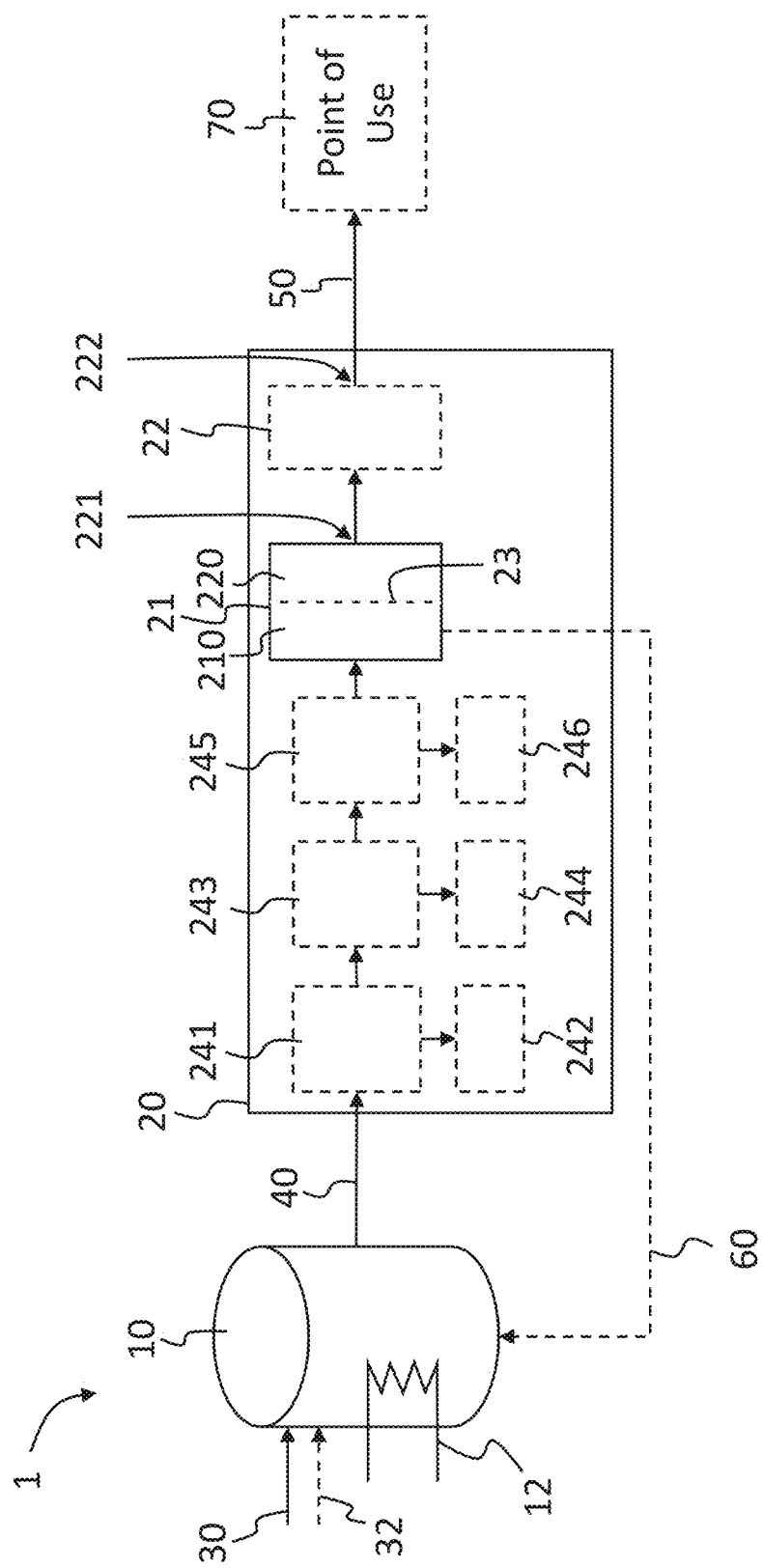
FIG. 3 is a flow diagram of the steam supply system of FIG. 1 according to an embodiment.

As shown in FIGS. 2 and 3, the membrane filtration system 20 may include additional filters in addition to the one or more membrane filters. For example, the membrane filtration system may include various sizes of particle filters 241, 243, 245, an adsorbent filter 22, or a combination thereof. Particle filters may be used to remove solid particles or liquid droplets. The additional filters may be independently selected and placed either upstream or downstream of the membrane filter 21 (e.g., downstream of the permeate side 220 of the membrane filter 21.) In the exemplary embodiment shown in FIG. 2, the system includes a membrane filter 21 and an adsorbent filter 22 downstream of the membrane filter 21. In the exemplary embodiment shown in FIG. 3, the system includes a membrane filter 21, an adsorbent filter 22 downstream of the membrane filter, and multiple particle filters 241, 243, 245. The particle filters 241, 243, 245 may be positioned upstream or downstream of the membrane filter 21. For example, particle filters 241, 243, 245 of decreasing size cut-offs may be arranged upstream of the membrane filter 21, as shown. A particle filter may also be positioned downstream of the adsorbent filter 22 to remove any fibers shed by the adsorbent filter 22.

In some embodiments, the membrane filtration system 20 includes one or more particle filters 241, 243, 245. The particles filters 241, 243, 245 may have a size cut-off of about 2 mm, 1 mm, 500 µm, 200 µm, 100 µm, 80 µm, 50 µm, 40 µm, 30 µm, 25 µm, 20 µm, 15 µm, 10 µm, 8 µm, 5 µm, 4 µm, 3 µm, 2 µm, or 1 µm. The membrane filtration system may include a combination of two or more particle filters with different size cut-offs. In one exemplary embodiment, a first particle filter 241 has a particle size cut-off of about 1 mm; a second particle size filter 243 has a particle size cut-off of about 25 µm; and a third particle size filter 245 has a particle size cut-off of about 5 µm. Each of the particle filters 241, 243, 245 may further be associated with a corresponding trap 242, 244, 246 or drain for removing separated particulate matter from the system.

In some embodiments, the membrane filtration system 20 includes one or more adsorbent filters 22. For example, the membrane filtration system 20 may include adsorbent filters 22 as a polishing step to remove remaining organic molecules that were not removed by the membrane filter 21. The adsorbent filter 22 may be arranged as a packed bed filter that contains an adsorbent and/or absorbent material, such as activated charcoal, a molecular sieve, other suitable materials, or a combination thereof. The number and size of adsorbent filters 22 in the membrane filtration system 20 may be selected to achieve a desired capacity of removal.

A flow of water (e.g., cross-flow 101 shown in FIG. 4A) entering the membrane filter 21 may have a first concentration of the organic compound. According to an embodiment, the water is heated and pressurized, e.g., superheated. The water may be heated to a temperature of 100° C. or greater, 105° C. or greater, 110° C. or greater, 125° C. or greater, 130° C. or greater, 150° C. or greater, or 175° C. or greater. The water may be heated to a temperature of 370° C. or less, 300° C. or less, 250° C. or less, 200° C. or less, 180° C. or less, 175° C. or less, 150° C. or less, or 130° C. or less. The water may be at a pressure greater than atmospheric pressure (1 atm; 14.7 psi or 101 kP) or greater, or about 15 psi or greater, about 20 psi or greater, about 25 psi or greater, about 30 psi or greater, or about 35 psi or greater, and/or about 150 psi or less, about 100 psi or less, about 80 psi or less, about 50 psi or less, or about 35 psi or less.

The filtration step at the membrane filter 21 may be characterized as pervaporation, where the permeate is in vapor phase. The permeate 120 exiting the permeate side 220 of the membrane filter 21 may be steam. The permeate 120 exiting the permeate side 220 of the membrane filter 21 at a first treated steam outlet 221 may have a second (reduced) concentration of the organic compound. If an adsorbent filter 22 is included, the permeate 120 is further treated in the adsorbent filter 22 and exits the adsorbent filter 22 at a second treated steam outlet 222, having a third (further reduced) concentration of the organic compound.

In embodiments where the membrane filtration system is used for removing anti-corrosive agents (e.g., amines) from the water used to generate steam, the steam becomes corrosive after the treatment (e.g., after removal of anti-corrosive agents), and it may thus be desirable to limit the exposure time of the downstream components to the treated steam by positioning the membrane filtration system in relatively close proximity to the point of use. For example, the treated steam may have a residence time of about 10 seconds or less, about 5 seconds or less, about 2 seconds or less, about 1 seconds or less, about 0.5 seconds or less, or about 0.1 seconds or less between the first treated steam outlet 221 and the point of use 70, and/or between the second treated steam outlet 222 and the point of use 70. In some embodiments, the first treated steam outlet 221 and/or the second treated steam outlet 222 may be positioned within 30 feet (10 meters), or within 10 feet (3 meters), or within 3 feet (1 meter) from the point of use 70. Put another way, it may be beneficial for the line 50 connecting the first treated steam outlet 221 and/or the second treated steam outlet 22 to the point of use to be 30 feet (10 meters) long or shorter, 10 feet (3 meters) long or shorter, or 3 feet (1 meter) long or shorter. The distances are given here as the linear length of the line 50 connecting the first treated steam outlet 221 and/or the second treated steam outlet 22 to the point of use.

The membrane filtration system 20 may include one or more membrane filters 21 to achieve a desired capacity for the membrane filtration system 20. In embodiments where the membrane filtration system 20 includes a plurality of membrane filters 21, the membrane filters 21 may be arranged in parallel, in series, or a combination thereof.

Figure 4A:
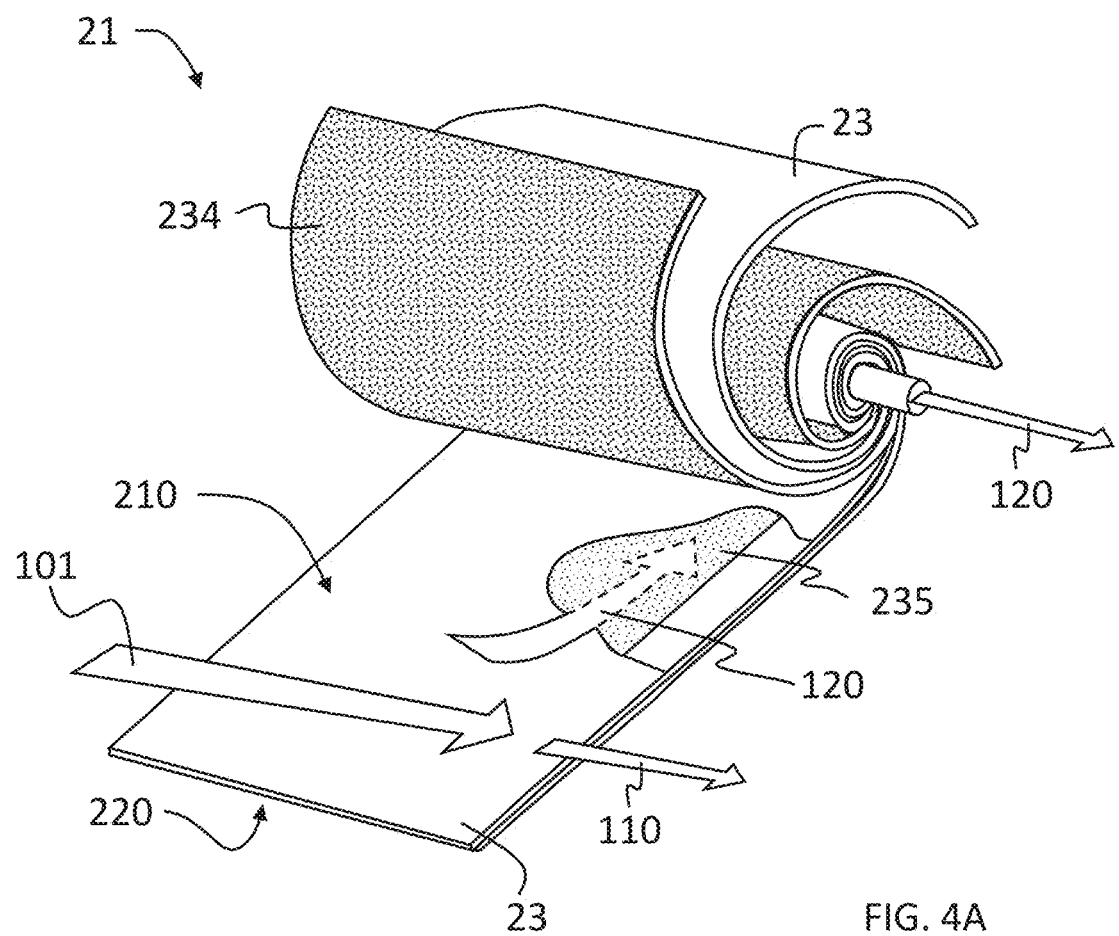
FIG. 4A is a schematic perspective view of the membrane filter used in the steam supply system of FIG. 1 according to an embodiment, where the membrane filter is shown partially unwound.
Figure 4B:
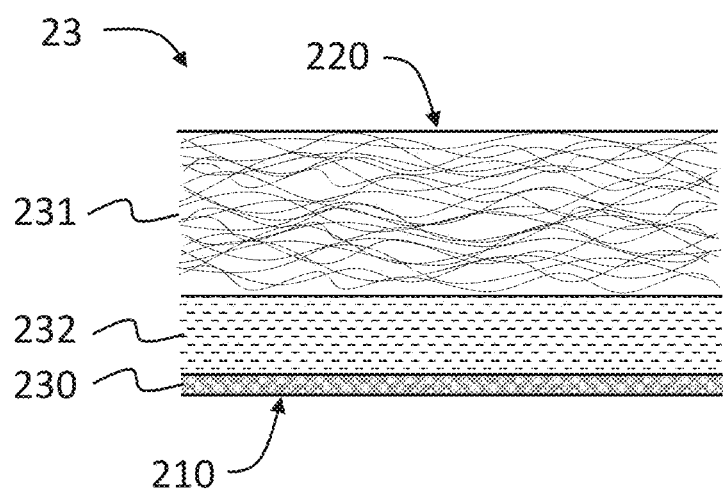
FIG. 4B is a schematic cross-sectional view of the separation membrane in the membrane filter of FIG. 4A.

In some embodiments, the membrane filters 21 are arranged as cross-flow filters. A schematic depiction of a membrane filter 21 that can be used in the membrane filtration system 20 is shown in FIG. 4A. The membrane filter 21 includes a separation membrane 23 selected to remove (e.g., retain) the organic compound(s) of interest. A schematic cross-sectional view of the separation membrane 23 is shown in FIG. 4B. The separation membrane 23 may include a separation layer 230 that is supported by one or more support layers 231, 232. In the exemplary embodiment shown, the separation layer 230 is supported by a first support layer 231 and a second support layer 232. The layers of the separation membrane 23 are arranged such that the first support layer 231 is on the permeate side 220 and the second support layer 232 is disposed between the first support layer 231 and the separation layer 230. When the superheated water reaches the separation layer 230, the membrane allows water vapor to pass through (e.g., permeate 120) to the permeate side 220, while rejecting the organic compound molecules and retaining them (e.g., retentate 110) on the retentate side 210 of the membrane filter 21.

The membrane filter 21 may include a plurality of layers of separation membranes 23. For example, the membrane filter 21 may be constructed as a wound roll of separation membranes 23, resulting in a cylindrical filter structure with input flow of water 101 at one end and output flows of retentate 110 and steam permeate 120 at the other end. An example of a wound membrane filter 21 is shown as partially unwound in FIG. 4A. The layers of separation membranes 23 may be separated by spacers 234. The separation membrane 23 itself may also include a spacer layer 235 to facilitate flow of permeate 120.

The membrane filter 21 and the membrane filter system 20 may be made up of various components, such as the separation membrane 23, separation layer 230, the one or more support layers 231, 232, spacers, adhesives, seals, sealants, housing, lines, connectors, etc. The materials of the components of the membrane filter 21 and the membrane filter system 20 may be selected so that (1) the membrane filter system 20 effectively removes the organic compounds of interest from the water, and (2) the materials can withstand the high temperature and pressure environment of the steam supply system 1. The superheated water supplied by the source of superheated water 10 is typically at a temperature of 100° C. or greater, e.g., about 95° C. or greater, about 100° C. or greater, or about 105° C. or greater, and/or up to about 135° C., up to about 140° C., up to about 150° C., or up to about 175° C. The system 1, including from the source of superheated water 10 to at least the retentate side 210 of the membrane filter 21, may be under pressure. For example, the system 1 may have an internal pressure of greater than atmospheric pressure (1 atm or greater), or about 15 psi or greater, about 20 psi or greater, about 25 psi or greater, about 30 psi or greater, or about 35 psi or greater, and/or up to about 150 psi, up to about 100 psi, up to about 80 psi, up to about 50 psi, or up to about 35 psi.

According to an embodiment, the materials of the membrane filter 21 and the membrane filter system 20 do not substantially degrade in the presence of water or steam at a temperature of about 100° C. or greater, or about 105° C. or greater, and/or up to about 135° C., up to about 140° C., up to about 150° C., or up to about 175° C.; and/or at a pressure greater than atmospheric pressure, or about 5 psi or greater, about 10 psi or greater, about 15 psi or greater, about 20 psi or greater, or about 30 psi or greater, and/or up to about 150 psi, up to about 100 psi, up to about 80 psi, up to about 50 psi, or up to about 35 psi. The materials may include the separation layer 230 and any support layers 231, 232, spacers 234, 235, adhesives, seals, sealants, housing, lines, connectors, etc., used in the membrane filtration system 20.

The term "degrade" is used here generally to mean a change in the chemical structure or physical integrity (e.g., an elastic or plastic deformation) of the material. The materials may be chosen to exhibit less than a threshold change (e.g., reduction) in a rheological indicator of material integrity (e.g., "material suitability criteria"). For example, the rheological indicator may be selected as tensile modulus, stress at 10% tensile strain, stress at tensile break, and/or elongation at tensile break. The threshold may be selected to be about 3%, about 4%, about 5%, about 6%, about 8%, about 10%, about 12%, or about 15%. If, for example, a 5% threshold is selected, the material suitability criteria may be: less than 5% decrease in tensile modulus, less than 5% decrease in stress at 10% tensile strain, less than 5% decrease in stress at tensile break, and/or less than 5% deviation in elongation at tensile break. Degradation of the materials may be tested by exposing the material (e.g., a component prepared from the material) to a steam environment that simulates the steam supply system 1 for a selected period of time and evaluating the material for changes in rheological properties.

Preferred materials used in the membrane filter system include materials that are non-hydrolyzable in the steam environment. In some embodiments, the materials may be substantially free or free of polyesters, polyamides, cellulose acetates, or combinations thereof.

Another consideration when selecting materials for the system 1 is temperature fluctuations and different expansion rates of different materials during such temperature fluctuations. For example, the temperature (and pressure) of the system may fluctuate during start-up and shut-down of the boiler between atmospheric conditions and the steam environment conditions discussed above. Different expansion rates of materials could lead to failure of materials, connections, or adhesives, or delamination of membrane filter layers. According to some embodiments, the materials are selected so that they exhibit equal or similar expansion during temperature fluctuations.

According to some embodiments, the separation layer 230 includes a fluorinated (e.g., perfluorinated) polymer membrane. Suitable polymers for preparing the separation layer 230 are disclosed, for example, in U.S. Pat. No. 8,828,121 (He et al.), and include copolymers of one or more perfluorodioxolane monomers. Other polymers that are selective for an organic molecule of interest may also be used.

Preferably, the separation layer 230 has a high selectivity for $H_2/N_2$. For example, the separation layer 230 has a $H_2/N_2$ selectivity of 5 or greater, 6 or greater, 7 or greater, 8 or greater, 9 or greater, 10 or greater, or 12 or greater. While there is no desired upper limit for the $H_2/N_2$ selectivity of the separation membrane, in reality selectivities may range up to about 100. Certain monomeric components, such as tetrafluoroethylene (TFE), may result in lower selectivity of the polymeric film. In some embodiments, the separation membrane does not include "tetrafluoroethylene (TFE) in the polymeric structure. However, TFE may be included in a support layer, spacer, or other layers that are not part of the separation layer.

In some embodiments the separation layer 230 includes a non-ionic fluorinated (e.g., perfluorinated) polymer membrane. In some embodiments the separation layer 230 is not an ion exchange membrane. The term "ion exchange membrane" is used here to refer to a membrane that includes chemical groups capable of combining with ions or exchanging ions between the membrane and an external substance. Such chemical groups may include sulfonic acid, carboxylic acid, phosphoric acid, phosphoric acid, arsenic groups, selenic groups, phenols, and salts thereof. Ion exchange membranes may require pretreating the membrane prior to use and periodically regenerating the membrane with an ionic fluid (e.g., and acid or base).

The separation layer 230 is supported by one or more support layers (e.g., a first and second support layer 231, 232). Support layer materials typically used in the prior art include cellulosic materials, which may not be able to withstand the steam environment. According to some embodiments, the one or more support layers include polysulfone, polyphenylene sulfide (PPS), polyvinylidenedifluoride (PVDF), polytetrafluoroethylene (PTFE), polyphenylsulfone (PPSU, available under tradename RADEL® R from Ensinger, Inc. in Washington, Pa.), polyetherimide (PEI, available under tradename ULTEM® from Sabic in Riyadh, Saudi Arabia), polyetheretherketone (PEEK), polyethersulfone (PES), polyethylene chlorotrifluoroethylene (ECTFE, available under tradename HALAR® from Solvay USA Inc in Princeton, N.J.), polyethylene tetrafluoroethylene (ETFE, available under tradename TEFZEL® from DuPont in Johnston, Iowa), polyfluorinated ethylene propylene (FEP), polychlorotrifluoroethylene (PCTFE, available under tradename NEOFLON™ from Daikin Industries, Ltd. in Osaka, Japan), perfluoroalkoxy (PFA, available under tradename NEOFLON™ from Daikin Industries, Ltd.), or a combination thereof. In one exemplary embodiment, at least one support layer is made from expanded PTFE.

The membrane filter 20 may include a plurality of layers of separation membranes 230 separated by spacers 234, and wherein the spacers 234 are constructed from polyamide, polyimide, polypropylene, polyethylene, PTFE, PVDF, polyester, polyamide, or a combination thereof.

The membrane filter 20 may also include various adhesives. Preferably, the adhesives are selected to withstand the steam environment. Examples of suitable adhesives include thermoset adhesives (e.g., epoxides, aldehyde-containing resins, and urethane-based adhesives), thermoplastic adhesives (e.g., acrylates).

Over time, the membrane filter system 20 may experience fouling that can cause blockage of filters, membranes, and other filter parts and/or reduce filter efficiency. Examples of possible foulants include accumulated particulate impurities and precipitated salts (e.g., salts of amines and carbonic acid). To address fouling issues, the system may include one or more mechanisms for removing accumulated materials. For example, the system may include parallel filters that can be used while the other filter(s) is being regenerated; a wash for washing a filter; a backwash or backflush for washing a filter by running reverse flow through the filter; a heater for heating a filter to remove accumulated volatile components; or a combination thereof.

The system may also include a temperature control unit for controlling the temperature (e.g., maintaining a substantially constant temperature) downstream of the source of superheated water (e.g., boiler). The temperature control unit may include a temperature sensor (e.g., thermocouple), a control unit (e.g., microprocessor or any other suitable control unit), and a heating and/or cooling unit.

In some cases, it may be desirable to reuse the organic component removed from the water. For example, the organic component may be an anti-corrosion agent added to the water in the source of superheated water to prevent corrosion in the system. The anti-corrosion agent is removed before the steam is used at the point of use. However, it may be desirable to recycle the anti-corrosion agent back to the source of superheated water for reuse. Thus, in some embodiments the system 1 includes a return line 60 from the retentate side 210 of the membrane filter 21 to the source of superheated water 10 or to a hot water source feed line (e.g., inlet line 30 or injection line 32). The system may include a return line 60 from the retentate side 210 to both the source of superheated water 10 and to a hot water source feed line (e.g., inlet line 30 or injection line 32).

The system 1 may also include additional components that are commonly used in steam supply systems, such as a steam header, valves, condensate traps, gauges, meters, mixers, thermostats, various connecting lines, and the like. In some embodiments, the system 1 includes a backpressure valve 62 in the retentate return line 60. The backpressure valve 62 may be configured and placed to effectively increase the pressure in the feed stream to the membrane filter 21. The backpressure valve 62 may be configured to not cause the pressure in the boiler to increase substantially. The additional pressure in the feed stream to the membrane filter 21 may be used to generate a higher steam production rate on the permeate side.

The steam generated by the steam supply system 1 may be used at any point of use. However, points of use that mandate certain maximum levels of organic molecules or organic contaminants may particularly benefit from the steam supply system 1 of the present disclosure. For example, the steam supply system 1 may be used to provide clean steam to points of use such as humidification, sterilization, or culinary uses.

According to an embodiment, steam may be generated in the steam supply system 1 by heating water in a source of superheated water 10 (e.g., a boiler). Additives, such as anti-corrosive agents, may be added to the water through an injection line 32, either directly into the source of superheated water 10, or into an input or output line. In one embodiment, anti-corrosion agent (e.g., amine) is dispensed to the source of superheated water at a concentration of 5 ppm to 100 ppm. The anticorrosion agent may include one or more amines. In addition or alternatively, the steam may include other organic compounds that may be undesired at the point of use.

Anti-corrosive agents are commonly added to steam to protect the boiler and other connected components from the corrosive effects of steam. As steam is used and then condensed, carbon dioxide dissolves in the water, resulting in the formation of carbonic acid ($H_2CO_3$) and the lowering of the pH. The acidic water may then cause corrosion of piping and equipment. Anti-corrosion agents, such as neutralizing amines, may be used to alleviate the effects of low pH. Neutralizing amines hydrolyze in water, generating hydroxide ions that neutralize the acid.

Examples of amines that may be used as anti-corrosion agents include cyclohexylamine, morpholine, diethylaminoethanol (DEAE), and diethylhydroxylamine (DEHA), methoxypropylamine, ammonia, 2-amino-2-methyl-1-propanol (available from Angus chemical company as AMP-95), and 5,5-dimethyl-1-pyrroline-n-oxide (DMPO). Other suitable amines may also be used.

However, while amines or other anti-corrosive agents may be helpful in the steam supply system, some end uses call for steam that is substantially free or free of such components. For example, culinary steam may be used in food production, where the steam may come into contact with food ingredients or with surfaces used in the preparation of food. Additives permitted in culinary steam may be regulated by law, such as by C.F.R. Title 21, § 173.310 in the United States. Other uses where additives may not be desired include the use of steam in humidification and sterilization.

Steam may also include other organic compounds or organic contaminants that may be additives (e.g., intentionally added to the steam) or that are present in the feed water into the steam supply system 1. The steam supply system 1 may also be used to remove such other organic compounds and organic contaminants. In particular, the steam supply system 1 may be used to remove volatile organic compounds and contaminants.

According to an embodiment, heated, pressurized water (e.g., superheated water) from the source of superheated water 10 is lead to the membrane filter system 20 through a hot water output line 40. The water leaving the source of superheated water 10 is typically under high pressure and/or temperature, and may have a high flow rate. For example, the water may have a temperature of about 95° C. or greater, about 100° C. or greater, or about 105° C. or greater, and/or up to about 135° C., up to about 140° C., up to about 150° C., or up to about 180° C. The water may be at a pressure of greater than atmospheric pressure (1 atm), or of about 15 psi or greater, about 20 psi or greater, about 25 psi or greater, about 30 psi or greater, or about 35 psi or greater, and/or up to about 150 psi, 100 psi, up to about 80 psi, up to about 50 psi, or up to about 35 psi.

The water may first be lead through one or more particle filters, such as the particle filters 241, 243, and 245 shown in FIG. 3. If a plurality of particle filters is used, the filters may be arranged from coarse to fine. Particles and condensate captured by the particle filters may be trapped in corresponding traps 242, 244, 246. After removing particulate matter from the water, the water is led into the membrane filter 21. According to an embodiment, the membrane filter 21 is arranged as a cross-flow filter, and a cross-flow of water 101 enters the membrane filter 21 on the retentate side 210, where the target organic compounds (e.g., anti-corrosion agents, such as amines, or organic contaminants) are retained and removed as retentate 110. Water permeates the separation membrane 23 as water vapor, and enters the permeate side 220 as permeate 120. The permeate 120 is substantially clean and dry steam that may be removed from the system and delivered to the point of use via output line 50. Optionally, the steam may be directed through an additional filter 22, such as an adsorbent filter and/or an additional particulate filter. An adsorbent filter may be used as a polishing step to remove trace amounts of organic compounds (e.g., anti-corrosion agents, such as amines, or organic contaminants) from the permeate.

The membrane filter 21, which may include multiple membrane filter units each housing a separation membrane 23 as described above, may be constructed to reject (e.g., retain) at least 50 wt-%, at least 75 wt-%, at least 80 wt-%, at least 85 wt-%, at least 90 wt-%, at least 95 wt-%, at least 98 wt-%, at least 99 wt-%, or 100 wt-% of the organic compounds of interest. The membrane filter 21 may be constructed to reject (e.g., retain) at least 50 wt-%, at least 75 wt-%, at least 80 wt-%, at least 85 wt-%, at least 90 wt-%, at least 95 wt-%, at least 98 wt-%, at least 99 wt-%, or 100 wt-% of the organic compounds introduced to the membrane filter at a concentration of 1,000 ppm or less, 900 ppm or less, 800 ppm or less, 700 ppm or less, 600 ppm or less, 500 ppm or less, 400 ppm or less, 300 ppm or less, 200 ppm or less, 100 ppm or less, 50 ppm or less, 40 ppm or less, 30 ppm or less, 20 ppm or less, or 10 ppm or less.

The cross-flow of water 101 may have a first concentration of the organic compound, and the permeate 120 may have a second concentration of the organic compound. The first concentration of organic compound may be 1,000 ppm or less, 900 ppm or less, 800 ppm or less, 700 ppm or less, 600 ppm or less, 500 ppm or less, 400 ppm or less, 300 ppm or less, 200 ppm or less, 100 ppm or less, 50 ppm or less, 40 ppm or less, 30 ppm or less, 20 ppm or less, or 10 ppm or less. The second concentration may be about 1% or less, about 2% or less, about 5% or less, about 10% or less, about 15% or less, or about 20% or less of the first concentration. The adsorbent filter may be constructed to remove at least 50 wt-%, at least 75 wt-%, at least 80 wt-%, at least 85 wt-%, at least 90 wt-%, at least 95 wt-%, at least 98 wt-%, at least 99 wt-%, or 100 wt-% of the organic compounds of interest remaining in the steam permeate after the membrane filter 21. The filtered steam leaving the adsorbent filter may have a third concentration of organic compound, which may be about 1% or less, about 2% or less, about 5% or less, about 10% or less, about 15% or less, or about 20% or less of the second concentration (permeate 120).

For example, it may be desirable that the water, while in the source of superheated water 10 and the lines leading up to the membrane filter 21, includes a concentration (e.g., a first concentration) of about 20 ppm to about 200 ppm of anti-corrosion agent (e.g., amine). It may further be desirable that the treated steam leaving the membrane filtration system 20 (via line 50) has a concentration (e.g., a second concentration) of less than about 10 ppm of anti-corrosion agent (e.g., amine). If the membrane filtration system 20 includes an adsorbent filter, the treated steam leaving the membrane filtration system 20 may have a concentration (e.g., a third concentration) of about 5 ppm or less of anti-corrosion agent (e.g., amine). In some preferred embodiments, the level of the anti-corrosion agent (e.g., amine) in the treated steam is at a non-detectable level (e.g., less than 1 ppm), or the treated steam is substantially free of the anti-corrosion agent (e.g., amine).

The rejected (e.g., retained) organic compound may be re-used in the system. For example, retentate 110, which may include recovered anti-corrosion agent (e.g., an amine), may be returned to the source of superheated water 10 (e.g., boiler) via a return line 60. The organic compound (e.g., anti-corrosion agent) is concentrated in the retentate 110, which may have a fourth concentration of the organic compound. The fourth concentration may be about 10 wt-% or greater, about 20 wt-% or greater, about 50 wt-% or greater, about 80 wt-% or greater, or about 90 wt-% or greater.

In one exemplary embodiment, anti-corrosion agent (e.g., amine) is added to a source of superheated water 10 used to produce steam. The anti-corrosion agent (e.g., amine) may be added at a concentration of 200 ppm or less, 100 ppm or less, 50 ppm or less, 40 ppm or less, 30 ppm or less, 20 ppm or less, or 10 ppm or less. Typically, anti-corrosion agent (e.g., amine) may be added at a concentration of about 10 ppm to about 50 ppm. The water from the source of superheated water 10 is then lead to the membrane filter system through an output line to remove or substantially remove the anti-corrosion agent (e.g., amine) and to generate treated water vapor (steam). The treated steam preferably contains anti-corrosion agent (e.g., amine) at a concentration of 10 ppm or less, 5 ppm or less, 4 ppm or less, 3 ppm or less, 2 ppm or less, 1 ppm or less, 0.5 ppm or less, 0.2 ppm or less, or 0.1 ppm or less. The anti-corrosion agent (e.g., amine) removed from the water as retentate may be reused, for example, returned to the source of superheated water 10 via a return line.

The method may further include washing, backflushing, and/or cleaning steps to remove accumulated particulates, precipitates, scale, or other forms of fouling from the system. Washing and backflushing steps may include washing or flushing with water and optionally with high or low pH cleaning agents. Cleaning steps may further include heating and rinsing cycles. In some embodiments, the system includes parallel filters (e.g., parallel particle filters, parallel membrane filters, and/or parallel adsorbent filters), and during a cleaning cycle, one of the parallel filters is cleaned while the other remains active.

EXAMPLES

The ability of three different gas separation membranes (A, B, and C) with different $H_2/N_2$ selectivities to separate amines from super-heated water was tested. The membranes were characterized by their nitrogen gas permeance as:

Membrane A: 185 gpu (gas permeation unit) nitrogen permeance, $H_2/N_2$ selectivity=6.6

Membrane B: 130 gpu nitrogen permeance, $H_2/N_2$ selectivity=7.8

Membrane C: 50 gpu nitrogen permeance, $H_2/N_2$ selectivity=12

Feed water samples were prepared by mixing 6 L of tap water and 50 ppm of either morpholine (MPH), cyclohexylamine (CHA), or diethylaminoethanol (DEAE). The amines were purchased from Sigma Aldrich and were used as received.

The membranes were tested in a laboratory-scale system with a steam boiler that was used to heat the water until a head pressure of about 40 psi was achieved. The membranes were tested in pervaporation mode and in vapor permeation mode. In pervaporation mode, a flow of heated pressurized water was drawn from the bottom of the boiler. In vapor permeation mode, pressurized steam was drawn from the headspace of the boiler. The membranes were mounted onto a cross-flow membrane holder Sterlitech CF016P, available from Sterlitech Corporation in Kent, Wash. The membranes had an exposed membrane area of 20.6 cm$^2$.

The amine content of the permeate samples was quantitated using liquid chromatography—mass spectroscopy (LCMS). The collected samples were diluted to 100× using deionized water. The samples were analyzed using an LCMS instrument from Agilent (Santa Clara, Calif.) with a KINETEX®2.6 μm C18 separation column (available from Phenomenex Inc. in Torrance, Calif.). Detection was performed using electrospray ionization in positive mode and referenced against concentration standards ranging from 0.06 to 0.6 ppm. Molecular amounts were determined from peak height of the M+H ion.

Example 1—Pervaporation Testing

Six liters of prepared feed water with 50 ppm amines was added into a boiler apparatus and heated until a head pressure of about 40 psi was achieved. A gear pump was then used to draw superheated water from the bottom of the boiler and to pass the superheated water across the test membrane for about 1 hour at a challenge flow rate of about 300 mL/min. The 40 psi system pressure drove the water/steam flux through the membrane. The permeate flow was condensed using chilled water.

Figure 5:
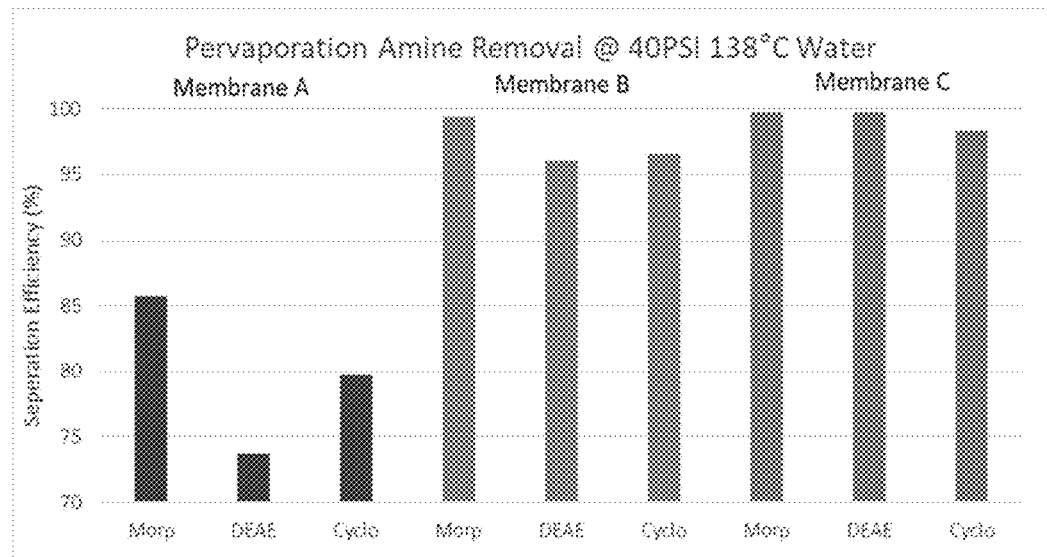
FIG. 5 is a graphical representation of the results of Example 1.

Permeate samples were collected and analyzed for amine content. The efficiency of each membrane in the pervaporation configuration was calculated. The results are shown in TABLE 1 below and in FIG. 5.

TABLE 1

Amine removal efficiency in pervaporation mode.

|  | Permeate flux in 1 hour (mL) | Efficiency (%) |
|---|---|---|
| Membrane A | | |
| Morpholine | 15.9 | 85.7 |
| Diethylethanolamine | 20.6 | 73.7 |
| Cyclohexylamine | 17.0 | 79.7 |
| Membrane B | | |
| Morpholine | 11.5 | 99.4 |
| Diethylethanolamine | 13.5 | 96.1 |
| Cyclohexylamine | 15.0 | 96.6 |
| Membrane C | | |
| Morpholine | 7.0 | 99.8 |
| Diethylethanolamine | 11.0 | 99.7 |
| Cyclohexylamine | 8.0 | 98.3 |

It was observed that the gas flow membranes could be used in pervaporation mode to remove amines from heated pressurized water to produce steam. The flux rate was the highest for membrane A and the lowest for membrane C. All three membranes were able to remove at least some portion of the tested amines. It was observed that the highest efficiency was obtained with membrane C, which had a $H_2/N_2$ selectivity of 12, highest of the three tested membranes. For membrane C, the efficiencies were 98.3% for cyclohexylamine, 99.7% for diethylethanolamine, and 99.8% for morpholine. It was also observed that all membranes had the highest efficiency for morpholine.

Example 2—Vapor Permeation Testing

Six liters of prepared feed water with 50 ppm amines was added into a boiler apparatus and heated until a head pressure of about 40 psi was achieved. The steam boiler was connected via a line to the cross-flow membrane holder. The flow across the membrane was driven by venting the retentate flow to atmospheric pressure. The retentate was drawn through a variable orifice valve and blown down to atmospheric pressure through a cold water jacketed condenser. The permeate flow was condensed with a cold water jacketed condenser and allowed to drip into a flask.

Figure 6:
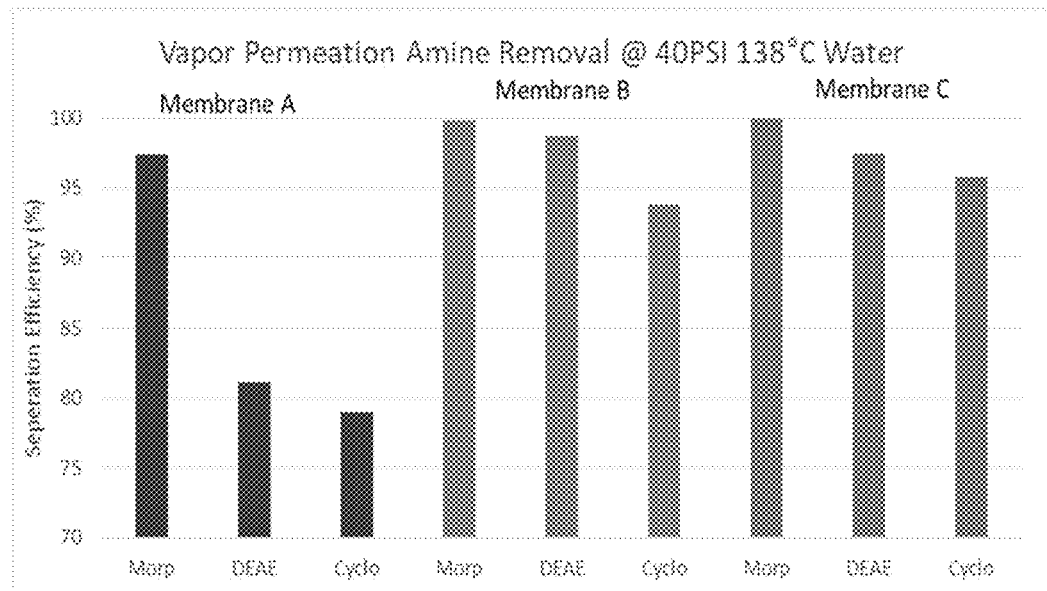
FIG. 6 is a graphical representation of the results of Example 2.

The amount of permeate and retentate flux were measured volumetrically. Permeate samples were collected and analyzed for amine content. The efficiency of each membrane in the vapor permeation configuration was calculated. The results are shown in TABLE 2 below and in FIG. 6.

TABLE 2

Amine removal efficiency in vapor permeation mode.

|  | Permeate flux (mL) | Retentate flux (mL) | Average pressure in boiler headspace (psi) | Efficiency (%) |
|---|---|---|---|---|
| Membrane A | | | | |
| Morpholine | 33 | 1008 | 35 | 97.3 |
| Diethylethanolamine | 35 | 830 | 40 | 81.1 |
| Cyclohexylamine | 34 | 921 | 38 | 83.2 |
| Membrane B | | | | |
| Morpholine | 23 | 1200 | 32 | 99.8 |
| Diethylethanolamine | 25 | 750 | 40 | 98.7 |
| Cyclohexylamine | 23 | 700 | 35 | 93.8 |
| Membrane C | | | | |
| Morpholine | 13 | 1100 | 30 | 99.9 |
| Diethylethanolamine | 13 | 917 | 35 | 97.4 |
| Cyclohexylamine | 14 | 800 | 35 | 95.8 |

Example 3—Full Scale Amine Removal

Figure 7:
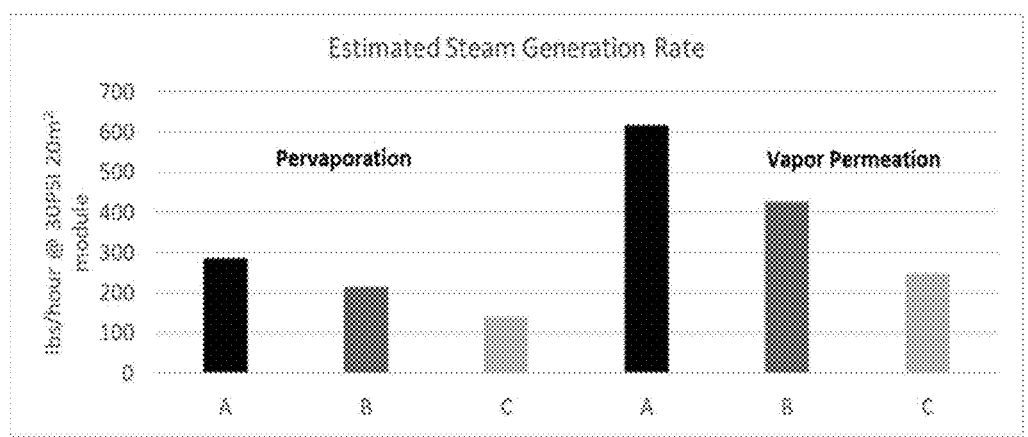
FIG. 7 is a graphical representation of the estimate of Example 3.

The amount of steam generated in a full size gas separation module was estimated by assuming a membrane area of 20 $m^2$, a typical size for a gas separation module. The driving force was set at 30 psi, which is believed to be a typical pressure used in boilers that provide steam for food production, medical sterilization, and room humidification. The flux rate from Examples 1 and 2, normalized by filter area, was used to calculate an estimated rate of steam generation. The estimated steam generation rates for the three membranes in pervaporation mode and vapor permeation mode are shown in FIG. 7.

The flow rate through the gas flow membranes in pervaporation mode was roughly half of the flow rate in vapor permeation mode. However, handling of heated pressurized water is less challenging technically than handling of pressurized steam. It was concluded that using gas flow membranes to remove amines from heated pressurized water to produce steam is feasible. It was hypothesized that using gas flow membranes to remove amines from heated pressurized water to produce steam is feasible in a full scale system.

The following is a list of exemplary aspects of the systems and methods according to the present disclosure.

According to aspect 1, a system for producing steam comprises: a source of superheated water comprising a hot water output capable of delivering heated water under pressure; a membrane filtration system in fluid communication with the hot water output, the membrane filtration system comprising: a first membrane filter with a permeate side and an opposing retentate side, the membrane filter comprising: a separation membrane adjacent the retentate side, the separation membrane being constructed to reject organic molecules; and one or more support layers adjacent the permeate side.

Aspect 2 is the system of aspect 1 further comprising an organic molecule injection line operatively connected to the source of superheated water.

Aspect 3 is the system of aspect 1 or 2, wherein the separation membrane comprises a perfluorinated polymer membrane.

Aspect 4 is the system of any one of aspects 1-3, wherein the separation membrane comprises a one or more support layers comprising polyamide, polyimide, polysulfone, polyphenylene sulfide, PVDF, PTFE, or a combination thereof.

Aspect 5 is the system of any one of aspects 1-4, wherein the membrane filter comprises adhesives that do not substantially degrade in the presence of pressurized water at a temperature of about 95° C. or greater, about 100° C. or greater, or about 105° C. or greater, and/or up to about 135° C., up to about 140° C., up to about 150° C., or up to about 180° C.; and/or at a pressure greater than atmospheric pressure, or about 5 psi or greater, about 10 psi or greater, about 15 psi or greater, about 20 psi or greater, or about 30 psi or greater, and/or up to about 150 psi, up to about 100 psi, up to about 80 psi, up to about 50 psi, or up to about 35 psi.

Aspect 6 is the system of any one of aspects 1-5, wherein the membrane filter comprises a plurality of layers of separation membranes separated by spacers, and wherein the spacers are constructed from polyamide, polyimide, polypropylene, polyethylene, PTFE, PVDF, or a combination thereof.

Aspect 7 is the system of any one of aspects 1-6, wherein the organic molecules comprise volatile organic contaminants.

Aspect 8 is the system of any one of aspects 1-7, wherein the organic molecules comprise an anti-corrosion agent.

Aspect 9 is the system of any one of aspects 1-8, wherein the organic molecules comprise an amine, and wherein optionally the amine may be selected from cyclohexylamine, morpholine, diethylethanolamine, diethylaminoethanol (DEAE), and diethylhydroxylamine (DEHA).

Aspect 10 is the system of any one of aspects 1-9, wherein the separation membrane is constructed to reject at least 90 wt-% of the organic molecules.

Aspect 11 is the system of any one of aspects 1-10 further comprising a return line from the retentate side to the source of superheated water or hot water source feed line.

Aspect 12 is the system of any one of aspects 1-11 further comprising a return line from the retentate side to the source of superheated water and hot water source feed line.

Aspect 13 is the system of any one of aspects 1-12 further comprising one or more additional filters upstream of the membrane filter or downstream of the membrane filter permeate side.

Aspect 14 is the system of aspect 13, wherein the one or more additional filters comprise a second membrane filter, an adsorbent filter, a particle filter, or a combination thereof.

Aspect 15 is the system of aspect 13 or 14, wherein the one or more additional filters comprise one or more particle filters upstream of the first membrane filter.

Aspect 16 is the system of any one of aspects 13-15, wherein the one or more additional filters comprise one or more particle filters downstream of the permeate side of the first membrane filter.

Aspect 17 is the system of any one of aspects 13-16, wherein the one or more additional filters comprise a second membrane filter arranged in parallel with the first membrane filter.

Aspect 18 is the system of any one of aspects 13-17, wherein the one or more additional filters comprise a second membrane filter arranged in series with the first membrane filter.

Aspect 19 is the system of any one of aspects 13-18, wherein the one or more additional filters comprise a first adsorbent filter and a second adsorbent filter arranged in parallel with one another.

Aspect 20 is the system of any one of aspects 13-19, wherein the one or more additional filters comprise a first adsorbent filter and a second adsorbent filter arranged in series with one another.

Aspect 21 is the system of any one of aspects 1-20 further comprising a second filtration system comprising a second membrane filter, an adsorbent filter, or both.

Aspect 22 is the system of any one of aspects 1-21, wherein the separation membrane does not substantially degrade at a temperature of about 95° C. or greater, about 100° C. or greater, or about 105° C. or greater, and/or up to about 135° C., up to about 140° C., up to about 150° C., or up to about 180° C.

Aspect 23 is the system of any one of aspects 1-22, wherein the separation membrane does not substantially degrade at a pressure greater than atmospheric pressure, or about 5 psi or greater, about 10 psi or greater, about 15 psi or greater, about 20 psi or greater, or about 30 psi or greater, and/or up to about 150 psi, up to about 100 psi, up to about 80 psi, up to about 50 psi, or up to about 35 psi.

Aspect 24 is the system of any one of aspects 1-23, wherein the hot water output has a capacity of at least about 10 lbs/hour (about 5 kg/h), at least about 100 lbs/hour (about 50 kg/h), at least about 500 lbs/hour (about 200 kg/h), and/or up to about 1,000 lbs/hour (about 500 kg/h), up to about 5,000 lbs/hour (about 2,000 kg/h), or up to about 10,000 lbs/hour (about 5,000 kg/h).

Aspect 25 is the system of any one of aspects 1-24, wherein the system is in fluid communication with a point of use comprising a sterilizer, a humidifier, or a culinary steam outlet.

Aspect 26 is the system of any one of aspects 1-25, wherein the system and the point of use are separated by a distance no greater than 10 meters, no greater than 3 meters, or no greater than 1 meter.

According to aspect 27, a method for producing steam comprises: directing a cross-flow of heated pressurized water comprising a first concentration of an organic compound across a membrane filter, the membrane filter comprising: a separation membrane constructed to reject the organic compound; and one or more support layers adjacent the separation membrane; and collecting a steam permeate comprising a second concentration of the organic compound that is lower than the first concentration.

Aspect 28 is the method of aspect 27, wherein the heated pressurized water has a temperature of about 95° C. or greater, about 100° C. or greater, or about 105° C. or greater, and/or up to about 135° C., up to about 140° C., up to about 150° C., or up to about 180° C.

Aspect 29 is the method of aspect 27 or 28, wherein the heated pressurized water has a pressure greater than atmospheric pressure, or about 5 psi or greater, about 10 psi or greater, about 15 psi or greater, about 20 psi or greater, or about 30 psi or greater, and/or up to about 150 psi, up to about 100 psi, up to about 80 psi, up to about 50 psi, or up to about 35 psi.

Aspect 30 is the method of any one of aspects 27-29, wherein the organic compound comprises an anti-corrosion agent.

Aspect 31 is the method of any one of aspects 27-30, wherein the organic compound comprises an amine.

Aspect 32 is the method of any one of aspects 27-31, wherein the first concentration is greater than 20 ppm and the second concentration is lower than 10 ppm.

Aspect 33 is the method of any one of aspects 27-32, wherein the second concentration is 1% or less, about 2% or less, about 5% or less, about 10% or less, about 15% or less, or about 20% or less of the first concentration.

Aspect 34 is the method of any one of aspects 27-33 further comprising recovering a retentate comprising the organic compound.

Aspect 35 is the method of any one of aspects 27-34 further comprising reusing the organic compound.

Aspect 36 is the method of any one of aspects 27-35 further comprising generating the heated pressurized water in a steam boiler and returning the retentate to the steam boiler or boiler feed line.

Aspect 37 is the method of any one of aspects 27-36 further comprising generating the heated pressurized water in a steam boiler and returning the retentate to the steam boiler and boiler feed line.

Aspect 38 is the method of any one of aspects 36-37 further comprising dispensing anti-corrosion agent to the boiler at a concentration of 5 ppm to 100 ppm.

Aspect 39 is the method of aspect 38, wherein the anti-corrosion agent comprises one or more amines.

Aspect 40 is the method of aspect 39, wherein the amines are selected from cyclohexylamine, morpholine, diethylethanolamine, diethylaminoethanol (DEAE), and diethylhydroxylamine (DEHA).

Aspect 41 is the method of any one of aspects 27-40 further comprising passing the steam permeate through a second membrane filter or an adsorbent filter.

Aspect 42 is the method of aspect 41, wherein a treated steam output after the second membrane filter or the adsorbent filter has a third concentration of the organic compound, and wherein the third concentration is less than 5 ppm, or wherein the third concentration is about 1% or less, about 2% or less, about 5% or less, about 10% or less, about 15% or less, or about 20% or less of the second concentration.

Aspect 43 is the method of any one of aspects 27-42, wherein the separation membrane comprises a perfluorinated polymer membrane.

Aspect 44 is the method of any one of aspects 27-43, wherein the separation membrane comprises a one or more support layers comprising polyamide, polyimide, polysulfone, polyphenylene sulfide, PVDF, PTFE, or a combination thereof.

Aspect 45 is the method of any one of aspects 27-44 further comprising washing, back flushing, or heating the membrane filter.

Aspect 46 is the method of any one of aspects 27-45 further comprising washing, back flushing, or heating the adsorbent filter.

Aspect 47 is the method of any one of aspects 27-46, wherein the steam permeate has a retention time of less than 10 seconds or less, about 5 seconds or less, about 2 seconds or less, about 1 seconds or less, about 0.5 seconds or less, or about 0.1 seconds or less between a treated steam outlet and a point of use.

Aspect 48 is the method of aspect 47, wherein the treated steam outlet is an outlet of the membrane filter.

Aspect 49 is the method of any one of aspects 27-48, wherein the cross-flow of the pressurized heated water has a flow rate of about 10 lbs/hour (about 5 kg/h) to about 10,000 lbs/hour (about 5,000 kg/h).

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. It should be understood that this disclosure is not intended to be unduly limited by the illustrative embodiments and examples set forth herein and that such examples and embodiments are presented by way of example only with the scope of the disclosure intended to be limited only by the claims set forth here.

The invention claimed is:

1. A system for producing steam, the system comprising:
a source of superheated water comprising a hot water output capable of delivering heated water under pressure;
a membrane filtration system in direct fluid communication with the hot water output, the membrane filtration system comprising:
a first membrane filter with a permeate side and an opposing retentate side, the membrane filter comprising:
a separation membrane adjacent the retentate side, the separation membrane being constructed to reject organic molecules; and
one or more support layers adjacent the permeate side, wherein permeate exiting the permeate side is steam.

2. The system of claim 1 further comprising an organic molecule injection line operatively connected to the source of superheated water.

3. The system of claim 1, wherein the separation membrane comprises a perfluorinated polymer membrane.

4. The system of claim 1, wherein the separation membrane comprises a one or more support layers comprising polyamide, polyimide, polysulfone, polyphenylene sulfide, PVDF, PTFE, or a combination thereof.

5. The system of claim 1, wherein the membrane filter comprises a plurality of layers of separation membranes separated by spacers, and wherein the spacers are constructed from polyamide, polyimide, polypropylene, polyethylene, PTFE, PVDF, or a combination thereof.

6. The system of claim 1, wherein the organic molecules comprise volatile organic contaminants, optionally wherein the volatile organic contaminants comprise an amine.

7. The system of claim 1, wherein the separation membrane is constructed to reject at least 90 wt-% of the organic molecules.

8. The system of claim 1 further comprising a return line from the retentate side to the source of superheated water or hot water source feed line.

9. The system of claim 1 further comprising one or more additional filters upstream of the membrane filter or downstream of the membrane filter permeate side, the one or more additional filters comprising a second membrane filter, an adsorbent filter, a particle filter, or a combination thereof.

10. The system of claim 9, wherein the one or more additional filters comprise a second membrane filter arranged in parallel or in series with the first membrane filter.

11. The system of claim 9, wherein the one or more additional filters comprise a first adsorbent filter and a second adsorbent filter arranged in parallel or in series with one another.

12. The system of claim 1, wherein the separation membrane does not substantially degrade at a temperature of about 100° C. to about 180° C. and/or at a pressure of above atmospheric pressure and up to about 100 psi.

13. The system of claim 1, wherein the system is in fluid communication with a point of use comprising a sterilizer, a humidifier, or a culinary steam outlet.

14. The system of claim 1, wherein the system and the point of use are separated by a distance no greater than 10 meters.

15. A method for producing steam, the method comprising:
   directing a cross-flow of heated pressurized water comprising a first concentration of an organic compound across a membrane filter, the heated pressurized water having a temperature of about 100° C. to about 150° C., the membrane filter comprising:
      a separation membrane constructed to reject the organic compound; and
      one or more support layers adjacent the separation membrane; and
   collecting a steam permeate comprising a second concentration of the organic compound that is lower than the first concentration.

16. The method of claim 15, wherein the organic molecules comprise volatile organic contaminants, optionally wherein the volatile organic contaminants comprise an amine.

17. The method of claim 15, wherein the amine is selected from cyclohexylamine, morpholine, diethylethanolamine, diethylaminoethanol (DEAE), and diethylhydroxylamine (DEHA).

18. The method of claim 15, wherein the first concentration is greater than 20 ppm and the second concentration is lower than 10 ppm.

19. The method of claim 15 further comprising recovering a retentate comprising the organic compound and reusing the organic compound.

20. The method of claim 15 further comprising generating the heated pressurized water in a steam boiler and returning the retentate to the steam boiler or boiler feed line.

* * * * *